United States Patent
Ives et al.

(10) Patent No.: US 9,054,512 B2
(45) Date of Patent: Jun. 9, 2015

(54) METHOD OF INSTALLING A HYDROELECTRIC TURBINE GENERATOR

(75) Inventors: James Ives, Dublin (IE); David Taaffe, Dublin (IE); Paul Dunne, Dublin (IE)

(73) Assignee: OpenHydro IP Limited, Dublin (IE)

( * ) Notice: Subject to any disclaimer, the term of this patent is extended or adjusted under 35 U.S.C. 154(b) by 493 days.

(21) Appl. No.: 13/133,805

(22) PCT Filed: Dec. 17, 2009

(86) PCT No.: PCT/EP2009/009067
§ 371 (c)(1),
(2), (4) Date: Aug. 23, 2011

(87) PCT Pub. No.: WO2010/069569
PCT Pub. Date: Jun. 24, 2010

(65) Prior Publication Data
US 2012/0027522 A1 Feb. 2, 2012

(30) Foreign Application Priority Data
Dec. 19, 2008 (EP) ..................................... 08022164

(51) Int. Cl.
*E02B 9/00* (2006.01)
*E02B 9/08* (2006.01)
*H02G 1/10* (2006.01)
*H02G 9/02* (2006.01)

(52) U.S. Cl.
CPC . *H02G 1/10* (2013.01); *H02G 9/02* (2013.01); *Y02E 10/28* (2013.01); *Y02E 10/38* (2013.01)

(58) Field of Classification Search
USPC .......... 60/641.2, 641.7, 801, 802; 405/75, 76, 405/77
See application file for complete search history.

(56) References Cited

U.S. PATENT DOCUMENTS

| | | |
|---|---|---|
| 228,467 A | 6/1880 | Maclay |
| 928,536 A | 7/1909 | Pino |
| 1,710,103 A | 4/1929 | Nelson |
| 2,054,142 A | 9/1936 | Sharp |
| 2,470,797 A | 5/1949 | Thomas |
| 2,501,696 A | 3/1950 | Souczek |
| 2,563,279 A | 8/1951 | Rushing |
| 2,658,453 A | 11/1953 | Walters |
| 2,782,321 A | 2/1957 | Fischer |
| 2,792,505 A | 5/1957 | Baudry |

(Continued)

FOREIGN PATENT DOCUMENTS

| | | |
|---|---|---|
| CA | 2388513 | 8/2000 |
| CA | 2352673 | 1/2003 |

(Continued)

OTHER PUBLICATIONS

U.S. Appl. No. 47/407,111, filed Apr. 26, 1988, Sato et al.

(Continued)

*Primary Examiner* — Benjamin Fiorello
*Assistant Examiner* — Edwin Toledo-Duran
(74) *Attorney, Agent, or Firm* — Gardner, Linn, Burkhart & Flory, LLP

(57) ABSTRACT

A method of installing an off-shore tidal hydroelectric turbine generator is described. The method provides for a number of safety features, ensuring that all components are safe to handle during the installation operation, and also ensuring that the turbine will not start spinning during the installation operation.

9 Claims, 3 Drawing Sheets

(56) References Cited

U.S. PATENT DOCUMENTS

| | | |
|---|---|---|
| 2,874,547 A | 2/1959 | Fiore |
| 3,078,680 A | 2/1963 | Wapsala |
| 3,209,156 A | 9/1965 | Struble, Jr. |
| 3,292,023 A | 12/1966 | Korber |
| 3,342,444 A | 9/1967 | Nelson |
| 3,355,998 A | 12/1967 | Roemisch |
| 3,384,787 A | 5/1968 | Schwartz |
| 3,422,275 A | 1/1969 | Braikevitch et al. |
| 3,433,024 A | 3/1969 | Diamond et al. |
| 3,469,627 A * | 9/1969 | Baker ............... 166/356 |
| 3,477,236 A | 11/1969 | Burrus |
| 3,487,805 A | 1/1970 | Satterthwaite et al. |
| 3,708,251 A | 1/1973 | Pierro |
| 3,986,787 A | 10/1976 | Mouton, Jr. et al. |
| 3,987,638 A | 10/1976 | Burkhardt et al. |
| 4,095,918 A | 6/1978 | Mouton et al. |
| 4,163,904 A | 8/1979 | Skendrovic |
| 4,219,303 A | 8/1980 | Mouton, Jr. et al. |
| 4,274,009 A | 6/1981 | Parker, Sr. |
| 4,367,413 A | 1/1983 | Nair |
| 4,421,990 A | 12/1983 | Heuss et al. |
| 4,427,897 A | 1/1984 | Migliori |
| 4,496,845 A * | 1/1985 | Ensign et al. ............ 290/43 |
| 4,523,878 A | 6/1985 | Richart et al. |
| 4,541,367 A | 9/1985 | Lindberg |
| 4,613,762 A | 9/1986 | Soderholm |
| 4,720,640 A | 1/1988 | Anderson et al. |
| 4,744,697 A | 5/1988 | Coppens |
| 4,744,698 A | 5/1988 | Dallimer et al. |
| 4,810,135 A | 3/1989 | Davenport et al. |
| 4,867,605 A | 9/1989 | Myers et al. |
| 4,868,408 A | 9/1989 | Hesh |
| 4,868,970 A | 9/1989 | Schultz et al. |
| 4,990,810 A | 2/1991 | Newhouse |
| 5,412,167 A * | 5/1995 | Mueller et al. ............ 200/43.14 |
| 5,495,221 A | 2/1996 | Post |
| 5,517,383 A * | 5/1996 | Webb ............... 361/191 |
| 5,592,816 A | 1/1997 | Williams |
| 5,606,791 A | 3/1997 | Fougere et al. |
| 5,609,441 A | 3/1997 | Khachaturian |
| 5,656,880 A | 8/1997 | Clark |
| 5,662,434 A | 9/1997 | Khachaturian |
| 5,715,590 A | 2/1998 | Fougere et al. |
| 5,800,093 A | 9/1998 | Khachaturian |
| 5,998,905 A | 12/1999 | Fougere et al. |
| 6,039,506 A | 3/2000 | Khachaturian |
| 6,109,863 A | 8/2000 | Milliken |
| 6,113,314 A | 9/2000 | Campbell |
| 6,166,472 A | 12/2000 | Pinkerton |
| 6,168,373 B1 | 1/2001 | Vauthier |
| 6,232,681 B1 | 5/2001 | Johnston et al. |
| 6,242,840 B1 | 6/2001 | Denk et al. |
| 6,293,734 B1 | 9/2001 | Thomas et al. |
| 6,300,689 B1 | 10/2001 | Smalser |
| 6,367,399 B1 | 4/2002 | Khachaturian |
| 6,406,251 B1 | 6/2002 | Vauthier |
| 6,409,466 B1 | 6/2002 | Lamont |
| 6,445,099 B1 | 9/2002 | Roseman |
| 6,476,709 B1 | 11/2002 | Wuidart et al. |
| 6,612,781 B1 | 9/2003 | Jackson |
| 6,648,589 B2 | 11/2003 | Williams |
| RE38,336 E | 12/2003 | Williams |
| 6,729,840 B2 | 5/2004 | Williams |
| 6,770,987 B1 | 8/2004 | Sogard et al. |
| 6,777,851 B2 | 8/2004 | Maslov |
| 6,806,586 B2 | 10/2004 | Wobben |
| 6,840,713 B1 | 1/2005 | Schia et al. |
| 6,843,191 B1 | 1/2005 | Makotinsky |
| 6,857,821 B2 | 2/2005 | Steenhuis et al. |
| 6,894,416 B1 * | 5/2005 | Leijon et al. ............ 310/196 |
| 6,957,947 B2 | 10/2005 | Williams |
| 6,998,730 B2 * | 2/2006 | Tharp ............... 290/54 |
| 7,190,087 B2 | 3/2007 | Williams |
| D543,495 S | 5/2007 | Williams et al. |
| 7,275,891 B2 | 10/2007 | Owen et al. |
| 7,352,078 B2 | 4/2008 | Gehring |
| 7,378,750 B2 | 5/2008 | Williams |
| 7,425,772 B2 | 9/2008 | Novo Vidal |
| 7,471,009 B2 | 12/2008 | Davis et al. |
| 7,527,006 B2 | 5/2009 | Khachaturian |
| 7,611,307 B2 | 11/2009 | Owen et al. |
| 7,845,296 B1 | 12/2010 | Khachaturian |
| 7,874,788 B2 | 1/2011 | Stothers et al. |
| 7,976,245 B2 | 7/2011 | Finnigan |
| 2002/0034437 A1 | 3/2002 | Williams |
| 2003/0044272 A1 | 3/2003 | Addie et al. |
| 2003/0137149 A1 | 7/2003 | Northrup et al. |
| 2003/0155829 A1 | 8/2003 | McMullen et al. |
| 2003/0168864 A1 | 9/2003 | Heronemus et al. |
| 2003/0193198 A1 | 10/2003 | Wobben |
| 2003/0218338 A1 | 11/2003 | O'Sullivan et al. |
| 2004/0021386 A1 | 2/2004 | Swett |
| 2004/0021437 A1 | 2/2004 | Maslov et al. |
| 2004/0201299 A1 | 10/2004 | Naritomi et al. |
| 2004/0227500 A1 | 11/2004 | O'Meara |
| 2004/0232792 A1 | 11/2004 | Enfourth |
| 2004/0262926 A1 | 12/2004 | Hansen |
| 2005/0001432 A1 * | 1/2005 | Drentham Susman et al. . 290/43 |
| 2005/0005592 A1 | 1/2005 | Fielder |
| 2005/0031442 A1 | 2/2005 | Williams |
| 2005/0073151 A1 | 4/2005 | Diamontopoulos |
| 2006/0261597 A1 | 11/2006 | Gehring |
| 2007/0018459 A1 | 1/2007 | Williams |
| 2007/0063448 A1 | 3/2007 | Kowalczyk |
| 2007/0164626 A1 | 7/2007 | Taniguchi et al. |
| 2007/0231072 A1 | 10/2007 | Jennings et al. |
| 2007/0241566 A1 * | 10/2007 | Kuehnle ............... 290/53 |
| 2007/0262668 A1 | 11/2007 | Brisson et al. |
| 2007/0291426 A1 | 12/2007 | Kasunich et al. |
| 2008/0012538 A1 | 1/2008 | Stewart et al. |
| 2009/0162144 A1 | 6/2009 | Ayre |
| 2009/0278351 A1 * | 11/2009 | Rivas et al. ............ 290/44 |
| 2009/0278357 A1 | 11/2009 | Williams |
| 2010/0025998 A1 | 2/2010 | Williams |
| 2010/0026002 A1 | 2/2010 | Spooner |
| 2010/0068037 A1 | 3/2010 | Ives |
| 2010/0133838 A1 | 6/2010 | Borgen |
| 2010/0172698 A1 | 7/2010 | Ives et al. |
| 2010/0201129 A1 | 8/2010 | Holstein et al. |
| 2010/0232885 A1 * | 9/2010 | Ives et al. ............ 405/204 |
| 2010/0295388 A1 | 11/2010 | Ives et al. |
| 2011/0018274 A1 | 1/2011 | Ives et al. |
| 2011/0088253 A1 | 4/2011 | Ives et al. |
| 2011/0110770 A1 | 5/2011 | Spooner et al. |
| 2011/0305518 A1 * | 12/2011 | Pearce et al. ............ 405/75 |
| 2012/0187680 A1 | 7/2012 | Spooner et al. |
| 2012/0235412 A1 | 9/2012 | Dunne et al. |

FOREIGN PATENT DOCUMENTS

| | | |
|---|---|---|
| CH | 260699 | 4/1947 |
| CH | 146935 | 8/1983 |
| DE | 3116740 | 11/1982 |
| DE | 3638129 | 5/1988 |
| DE | 3718954 | 12/1988 |
| DE | 19948198 | 4/2001 |
| DE | 10101405 | 7/2002 |
| DE | 20308901 | 9/2003 |
| DE | 10244038 | 4/2004 |
| DE | 102007016380 | 10/2008 |
| EP | 1318299 | 12/2003 |
| EP | 1564455 | 1/2005 |
| EP | 1691377 | 2/2006 |
| EP | 1863162 A2 * | 12/2007 |
| EP | 1876350 | 1/2008 |
| EP | 1878912 | 1/2008 |
| EP | 1878913 | 1/2008 |
| EP | 1879280 | 1/2008 |
| EP | 1878911 | 9/2008 |
| EP | 1992741 | 11/2008 |
| EP | 1885047 | 12/2008 |
| EP | 1980670 | 7/2009 |
| EP | 2088311 | 8/2009 |
| EP | 2110910 | 10/2009 |

(56) References Cited

FOREIGN PATENT DOCUMENTS

| | | |
|---|---|---|
| EP | 2112370 | 10/2009 |
| EP | 1980746 | 6/2010 |
| EP | 2199199 | 6/2010 |
| EP | 2199598 | 6/2010 |
| EP | 2199599 | 6/2010 |
| EP | 2199601 | 6/2010 |
| EP | 2199602 | 6/2010 |
| EP | 2199603 | 6/2010 |
| EP | 2200170 | 6/2010 |
| EP | 2071709 | 9/2010 |
| EP | 2209175 | 9/2010 |
| EP | 2241749 | 10/2010 |
| EP | 2302204 | 3/2011 |
| EP | 2302755 | 3/2011 |
| EP | 2302766 | 3/2011 |
| FR | 2823177 | 10/2002 |
| FR | 2859495 | 3/2005 |
| GB | 204505 | 10/1923 |
| GB | 924347 | 4/1963 |
| GB | 980575 | 1/1965 |
| GB | 1131352 | 10/1968 |
| GB | 1413835 | 11/1975 |
| GB | 2316461 | 2/1998 |
| GB | 2344843 | 6/2000 |
| GB | 2408294 | 5/2005 |
| GB | 2431628 | 5/2007 |
| GB | 2434413 | 7/2007 |
| GB | 2447514 | 9/2008 |
| JP | 59203881 | 11/1984 |
| JP | 63055370 | 3/1988 |
| JP | 01043908 | 2/1989 |
| JP | 2000341818 | 12/2000 |
| JP | 2005069025 | 3/2005 |
| JP | 2005248822 | 9/2005 |
| JP | 2006-109560 | * 4/2006 |
| JP | 2006094645 | 4/2006 |
| JP | 2007255614 | 10/2007 |
| JP | 2007291882 | 11/2007 |
| WO | 9844372 | 10/1998 |
| WO | 9852819 | 11/1998 |
| WO | 9966623 | 12/1999 |
| WO | 0077393 | 12/2000 |
| WO | 0134973 | 5/2001 |
| WO | 0134977 | 5/2001 |
| WO | 02099950 | 12/2002 |
| WO | 03014561 | 2/2003 |
| WO | 03025385 | 3/2003 |
| WO | 03046375 | 6/2003 |
| WO | 2004015264 | 2/2004 |
| WO | 2004027257 | 4/2004 |
| WO | 2004107549 | 12/2004 |
| WO | 2004113717 | 12/2004 |
| WO | 2005045243 | 5/2005 |
| WO | 2005061887 | 7/2005 |
| WO | 2005078233 | 8/2005 |
| WO | 2005080789 | 9/2005 |
| WO | 2005116443 | 12/2005 |
| WO | 2006029496 | 3/2006 |
| WO | 2007043894 | 4/2007 |
| WO | 2007055585 | 5/2007 |
| WO | 2007083105 | 7/2007 |
| WO | 2007086814 | 8/2007 |
| WO | 2007125349 | 11/2007 |
| WO | WO2007125349 | 11/2007 |
| WO | 2008004877 | 1/2008 |
| WO | 2008006614 | 1/2008 |
| WO | 2008050149 | 5/2008 |
| WO | 2008081187 | 7/2008 |
| WO | 2009/016409 A2 | 2/2009 |
| WO | WO2010118766 | 10/2010 |
| WO | WO2011039249 | 4/2011 |
| WO | WO2011039255 | 4/2011 |
| WO | WO2011039267 | 4/2011 |

OTHER PUBLICATIONS

U.S. Appl. No. 13/133,235, filed Jun. 7, 2011, including the specification, claims and drawings.
U.S. Appl. No. 13/133,504 filed Jun. 8, 2011, including the specification, claims and drawings.
U.S. Appl. No. 13/133,507 filed Jun. 8, 2011, including the specification, claims and drawings.
U.S. Appl. No. 13/133,832 filed Jun. 9, 2011, including the specification, claims and drawings.
U.S. Appl. No. 13/264,667 filed Oct. 14, 2011, including specification, claims and drawings.
International Search Report completed May 26, 2011, mailed Jun. 7, 2011, from corresponding Application No. PCT/EP2009/009067.
PCT Written Opinion of International Searching Authority, May 26, 2011, from corresponding Application No. PCT/EP2009/009067.

* cited by examiner

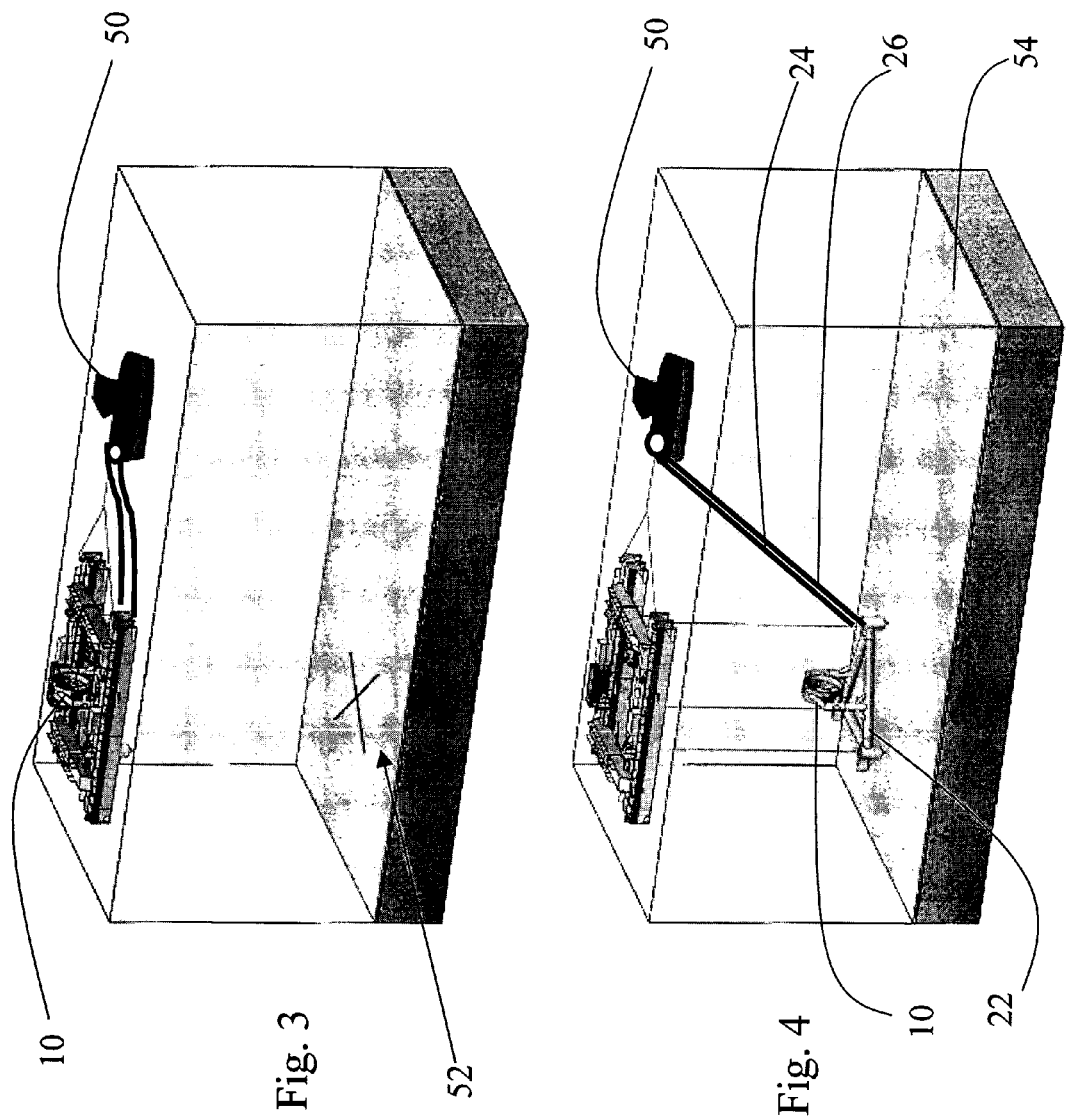

METHOD OF INSTALLING A HYDROELECTRIC TURBINE GENERATOR

FIELD OF THE INVENTION

This invention relates to a method of safely installing a sub sea tidal hydroelectric turbine generator.

BACKGROUND OF THE INVENTION

The increased interest in environmental awareness, and a reluctance to rely on non-renewable sources of energy, has led to greater usage of renewable energy systems, e.g. solar power, wind power, thermal power, and tidal power. The latter involves the installation of turbine generators in an area of tidal flow, and converts the energy of the tides into electrical power.

With reference to FIG. 1, a direct-drive shaftless permanent magnet hydroelectric turbine generator is described in PCT Application No. PCT/EP2007/006258. The generator 10 comprises a ring-shaped stator 12 and a rotor 14, the stator 12 having a plurality of coils (not shown) located about the circumference of the stator 12. The rotor 14 comprises an inner rim 16, which defines an open centre. The rotor 14 further comprises an array of generally radially extending blades 18 captured between the inner rim 16 and an outer rim 20. The rotor 14 further comprises an array of magnets (not shown) disposed about the outer rim 20. The stator 12 concentrically surrounds the rotor 14, with the plurality of coils providing a magnetic flux return path for the magnets.

The generator 10 is positioned in an area of tidal flow, such that the motion of the seawater through the generator 10 acts on the blades 18, resulting in rotation of the rotor 14 within the stator 12. The motion of the magnets relative to the coils of the stator 12 causes the magnetic field generated by the magnets to induce an EMF in each of the coils. These induced EMFs provide the electrical power output from the turbine generator 10.

In the interests of accepted good practice, it is understood that certain safety rules should be followed when undertaking the installation and connection of high voltage electrical equipment, e.g. the equipment should be switched out from all possible points of supply; isolated from all possible points of supply; safeguarded by safety padlocks being applied at switch points; and connected to earth by circuit main earths.

While the above criteria can be easily adhered to when dealing with above sea electrical equipment, the problem associated with isolation of an underwater turbine generator largely comes from the inaccessibility of switchgear, and the need to energise and de-energise the turbine generator from a significant distance away (e.g. from an on-shore power sub-station).

It is therefore the object of this method patent to provide a method for installing and connecting a hydroelectric turbine generator that provides certainty and safety, and reduces the operations required in potentially hazardous conditions.

SUMMARY OF THE INVENTION

Accordingly, there is provided a method of installing a sub sea tidal hydroelectric turbine generator and connecting the turbine generator to a supply grid using a submarine power cable, wherein the hydroelectric turbine generator comprises an electrical braking system operable to apply an electrical brake to the turbine upon interruption of a control signal, wherein the control signal is transmitted from a controller at a connection point to said supply grid through said submarine power cable, the method comprising the steps of:

(i) laying a submarine power cable into position, the submarine power cable extending from a first end, at a connection point to a supply grid, to a second end, at an installation site where it is desired to install a sub sea tidal hydroelectric turbine generator;
(ii) connecting the submarine power cable to the connection point;
(iii) switching the submarine power cable out from the supply grid using a supply switch;
(iv) isolating the submarine power cable from the supply grid using an isolating switch, connecting the power cable to earth;
(v) applying a safety padlock to the supply switch and the isolating switch;
(vi) interrupting the control signal at said controller by opening a control switch, applying an electrical brake to the turbine generator;
(vii) applying a safety padlock to the control switch;
(viii) deploying said hydroelectric turbine generator at said installation site;
(ix) connecting the submarine power cable to said hydroelectric turbine generator;
(x) removing the safety padlock from to the supply switch and the isolating switch;
(xi) disconnecting the power cable from earth using the isolating switch;
(xii) switching the power cable on to the supply grid using the supply switch;
(xiii) removing the safety padlock from the control switch; and
(xiv) closing the control switch, such that the electrical brake is removed from the turbine generator, and allowing the generator to commence generation.

As the turbine generator is being lowered into position on site, it is impossible for the turbine to start spinning during installation. This is because the latched contactor cannot change state without a supply signal, which can only be applied through the submarine power cable, the cable remaining unconnected to the turbine generator until after the generator has been deployed. Also, the electrical braking system of the turbine generator requires the receipt of a control signal before the electrical brake can be released from the turbine. As the control signal is transmitted via the submarine power cable, it is impossible for the brake to be released without the power cable being connected to the generator. Thus the installation personnel can be assured that the turbine will not start spinning while the generator is being deployed. Furthermore, as the submarine power cable is switched out and isolated from the main supply grid, installation personnel can safely handle the power cable during the installation operation as it is not live.

Preferably, the method further comprises the step of testing that all sub sea circuits are dead, prior to step (ix).

It is important from a safety aspect that it is certain that all sub sea circuits are dead and are securely cut off from the supply before deployment of the generator, to ensure that there is no danger of electrical shocks and/or movement of the turbine during installation.

Preferably, steps (ii)-(viii) and (xi)-(xvi) are performed at said connection point.

As the majority of the steps can be performed remote to the installation site of the turbine generator, this reduces the number of steps that must be performed at the off-shore site, and correspondingly reduces risks associated with operating in variable weather conditions.

Preferably, the method further comprises the steps of:
(a) recording a location designation associated with the second end of the submarine power cable once the power cable has been switched out and isolated; and
(b) prior to step (ix), verifying that the turbine deployment is occurring at the location designation associated with the second end of said particular submarine power cable.

The implementation of a dedicated verification step means that the turbine generator will only be deployed at the correct location, and ensures that the installation operatives will not be connecting the turbine generator to a potentially live submarine power cable.

Preferably, said location designation comprises GPS co-ordinates.

Preferably, the method further comprises the steps of:
(a) closing a latched contactor on the hydroelectric turbine generator to connect the positive and negative output terminals of the hydroelectric turbine generator to earth prior to deploying said hydroelectric turbine generator at said installation site; and
(b) after the deployment of said hydroelectric turbine generator at said installation site, opening the latched contactor to disconnect the output terminals of the hydroelectric turbine generator from earth.

Preferably, step (ix) further comprises deploying said hydroelectric turbine generator at said installation site such that the axis of the turbine is aligned with the direction of the prevailing tidal current at said installation site.

As the turbine generator is aligned with the tidal current, this provides for the optimum performance of the turbine at the installation site.

Preferably, the hydroelectric turbine generator comprises a generator cable for connecting the generator to a submarine power cable, and wherein step (x) further comprises recovering the second end of said submarine power cable and said generator cable to an installation vessel for connection, wherein the submarine power cable and the generator cable act to stabilise the installation vessel in position at said installation site.

The submarine power cable and the generator cable of the installed generator provide a mooring facility for the installation vessel, helping to stabilise the installation site at the off-shore location.

There is also provided a method of installing an array of hydroelectric turbine generators, comprising the steps of installing a single hydroelectric turbine generator as described above, wherein the hydroelectric turbine generator further comprises an expansion cable for connecting to a further hydroelectric turbine generator, such that a plurality of hydroelectric turbine generators can be daisy-chained together, and wherein the method further comprises the steps of:
(a) deploying a successive hydroelectric turbine generator at a successive installation site;
(b) connecting the expansion cable of the preceding hydroelectric turbine generator to the generator cable of the successive hydroelectric turbine generator; and
(c) repeating steps (a) and (b) for each of the hydroelectric turbine generators in the array, wherein steps (a)-(c) are performed prior to steps (xi)-(xvi).

As the hydroelectric turbine generators can be daisy-chained together in series, the installation of an array of turbines is carried out with the entire string of turbines isolated, earthed and locked. The entire array of turbines is then energised together.

DETAILED DESCRIPTION OF THE INVENTION

An embodiment of the invention will now be described, by way of example only, with reference to the accompanying drawings, in which:

FIG. 3 is a view of an installation vessel and a hydroelectric turbine generator prior to deployment at an installation site; and FIG. 4 is a view of an installation vessel and a hydroelectric turbine generator after deployment at an installation site.

Figure 1:
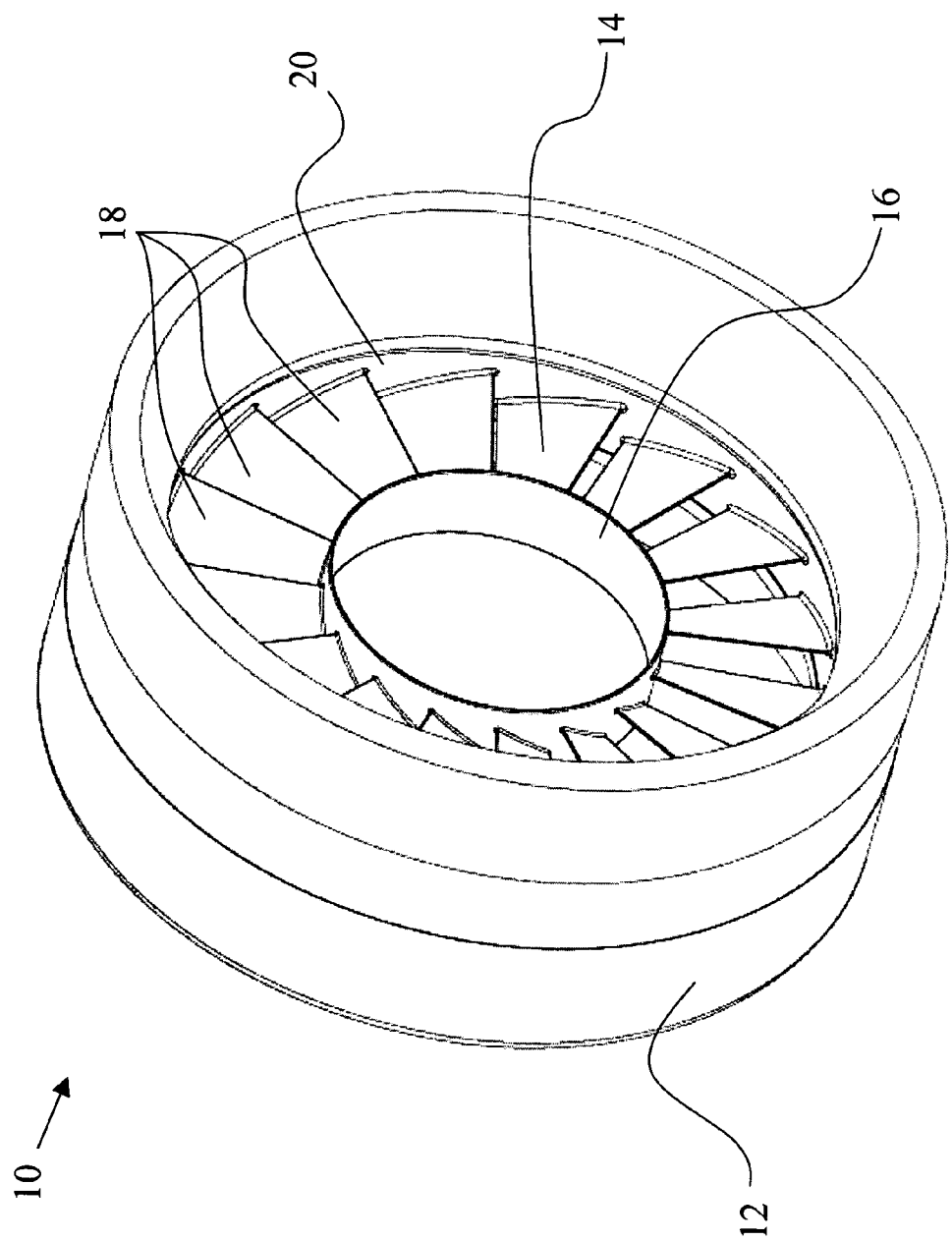
FIG. 1 is an isometric view of a prior art hydroelectric turbine generator.
Figure 2:
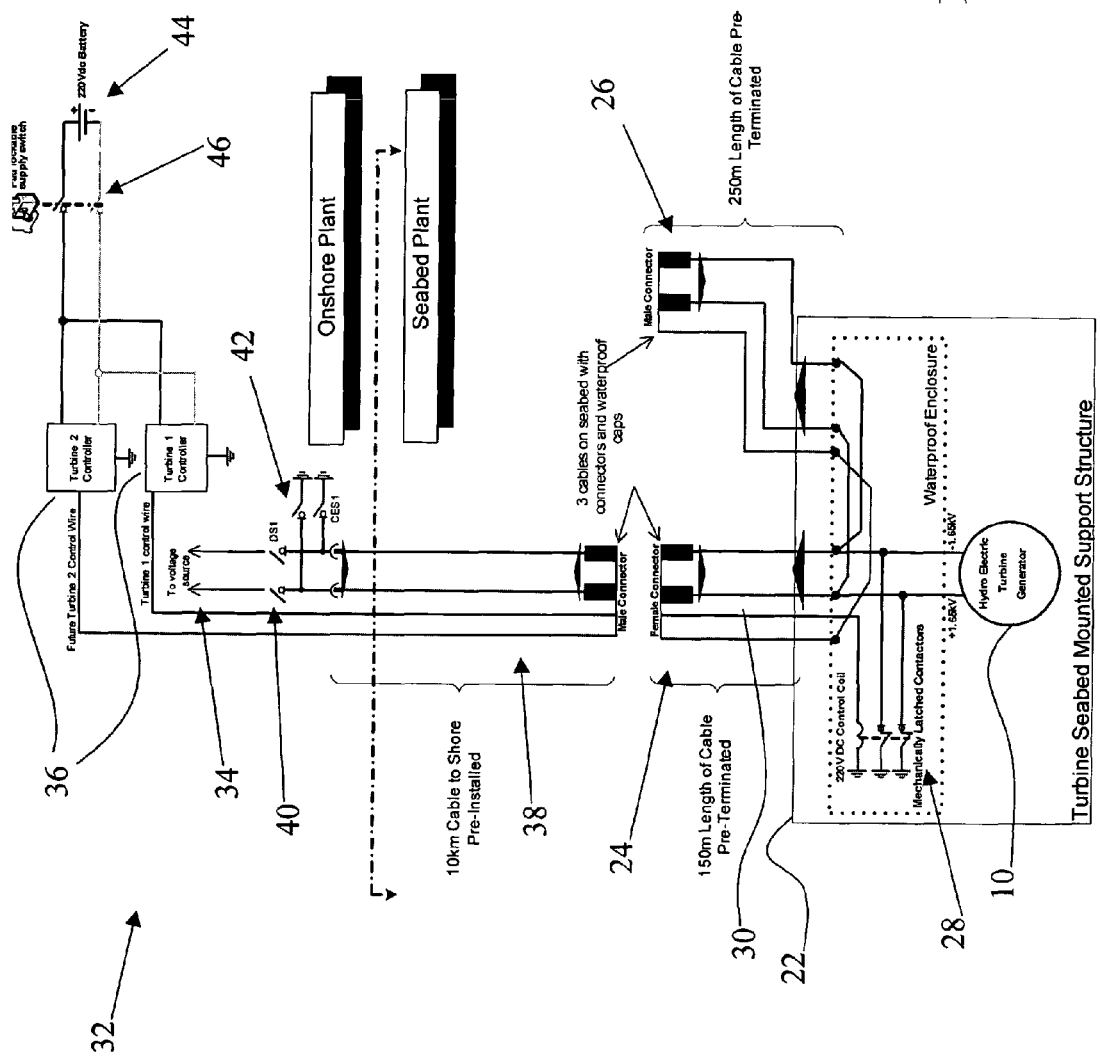
FIG. 2 is an outline of a sample configuration used for the installation and connection of a hydroelectric turbine generator to a supply grid.

With reference to FIG. 2, an overall view is presented of a sample circuit scheme for the installation of a hydroelectric turbine generator 10. The generator 10 is installed at an installation site in an area of tidal flow, the generator 10 being provided on a seabed mounted support structure 22. The generator 10 further comprises a generator cable 24, operable to connect a generator 10 with a submarine power cable, the generator cable 24 comprising the appropriate power lines for connection to the output terminals of the generator 10.

The generator 10 may further comprise an expansion cable 26, the expansion cable 26 comprising a further set of power lines coupled to the power lines of the generator cable 24, the expansion cable 26 allowing for a series of separate generators 10 to be daisy-chained together, so that the output of a series of generators 10 can be connected to a single submarine power cable.

The generator 10 comprises a set of mechanically latched two pole DC contactors 28, the contactors 28 connected between the generator's 10 positive output and earth, and between the generator's 10 negative output and earth. The contactors 28 are controlled by a DC control wire 30, the input to the DC control wire 30 received from the generator cable 24.

The generator 10 may also comprise an electrical braking system (not shown), the electrical braking system operable to apply a short circuit across at least a portion of the coils in the generator 10, in order to apply an electrical brake to the turbine and to prevent rotation of the turbine. The electrical braking system is actuated by a control signal received from the generator cable 24, such that if there is an interruption to the supply of the control signal the electrical brake is applied.

An on-shore substation is indicated generally at 32. The substation 32 comprises a connection 34 to a voltage source, e.g. a supply grid. The substation also comprises a plurality of controller 36, the controllers 36 operable to generate control signals for the generators 10.

The substation 32 is connected to a submarine power cable 38. The cable is laid from a first point at the substation 32 to a second point where it is desired to install the generator 10. The cable 38 comprises power core lines to transmit power generated by the generator 10, and at least one control wire for the transmission of control signals from the substation 32 to the generator 10. The power cable 38 is connected to the substation 32.

The substation 32 further comprises supply switches 40 connecting the power lines of cable 38 with the voltage source connection 34, and isolation switches 42 connecting the power lines of cable 38 with earth.

The substation 32 further comprises a controller voltage source 44 operable to provide power to the controllers 36, the controller voltage source 44 connected to the controllers 36 via a controller supply switch 46.

In preparation for turbine deployment and connection, the mechanically latched contactor 28 is set in the closed position, connecting the generator's 10 positive and negative output terminals to earth. The latched position of this contactor is tested and verified by the senior authorised electrical person (SAEP) for the installation operation, who will be responsible for the upcoming offshore electrical works.

Prior to deployment, the supply switch 40 should be opened, and the isolation switch 42 should be closed. This operation is witnessed by the SAEP. These two switch arrangements are then secured with a safety padlock, and possession of the key is retained by the SAEP.

Prior to deployment the controller supply switch 46 for the controllers 36 is also opened, and padlocked in place. The key for this lock should be also be retained by the SAEP.

The SAEP shall ensure that all sub sea circuits are dead, by using a calibrated voltage testing device while at the on-shore substation.

Only when the SAEP is satisfied with the turbine generator isolation arrangement (by the closing of the contactor 28 and the cutting of the supply to the controllers 36), the onshore substation isolation (by the opening of the supply switch 40 and the closing of the isolation switch 42), and has possession of all the keys of the safety padlocks can offshore operations commence. The SAEP is required to give approval for departure once they are satisfied with the above.

Prior to departure, the SAEP records location information regarding the end of the submarine power cable 38 that has just been disconnected from the supply and isolated.

With reference to FIG. 3, once the installation site 52 is reached, the SAEP is responsible for verifying that the GPS coordinates of the installation vessel 50 coincide with the co-ordinates of the recorded position of the particular cable end that was isolated above. Once this has been verified, the deployment of the turbine generator 10 at the installation site 52 may commence.

The turbine generator 10 is deployed with the mechanically latched contactor 28 in the closed position. The SAEP and working party can be safe in the knowledge that it is impossible for the turbine generator 10 to start spinning during deployment, due to the fact that the submarine power cable 38 is not connected, and therefore it is impossible for the contactor 28 to change state, or for the electrical brake to release. This serves a similar function as the onshore padlocks.

With reference to FIG. 4, the generator 10 and the support structure 22 are lowered to the seabed 54 with the generator cable 24 and the extension cable 26 being paid out under tension from the deck of the turbine deployment vessel 50 as described in FIG. 3. Once the turbine generator 10 is positioned on the seabed 54, the vessel 50 begins to lay out the two cable tails 24,26. The ends of the cables 24,26 are deployed with a clump weight (not shown). The ends of the cables can be handled with no risk of becoming electrically live, as it is impossible for the latched contactor 28 to change position, or for the electrical braking system to disengage, without a supply. Supply is not available until the cable 38 is completely connected to the generator cable 24 and unlocked back at the on-shore substation 32. The contactors 28 also connect the generator cable 24 (and therefore the extension cable 26) to a local earth point, so the cables 24,26 are well earthed.

The end of the submarine power cable 38 and the end of the generator cable 24 can then be recovered to the deck of the cable installation vessel 50, and joined to connect the generator cable 24 to the on-shore substation 32. The generator cable 24 is safe to handle during this jointing procedure, as it is not possible to make it live until the cable joint has been complete. Further reassurance is provided by the fact that the supply to the submarine power cable 38 is padlocked in the open position (supply switch 40), and the key for this lock is in possession of the SAEP in charge of the cable connection.

Since the turbine generator axes are aligned with the current, during the cable jointing operation the vessel 50 will be aligned with the current, with twin cable catenaries spread from her stem. The generator cable 24 and its attachment to the tidal turbine support structure 22 will be of sufficient strength to allow it to be used to provide significant mooring force. Without exceeding the maximum allowable tension on the cables, the two cable catenaries of the generator cable 30 and the submarine power cable 24 will provide a reference and stabilising effect to assist vessel positioning which is generally a high risk factor when carrying out jointing operations in high-energy tidal sites.

Once the cable joint is completed, the ends of the two cables 38,24 will be lowered to the seabed 54.

The offshore operation is now completed. The turbine generator 10 can now be commissioned and made live from the on-shore substation 32. The SAEP returns to the on-shore substation 32, and all safety padlocks are removed.

The isolation switch 42 is opened, disconnecting the power cable 38 from earth. The supply switch 40 is closed, connecting the power cable 38 to the load. The controller supply switch 46 is turned on. It is now possible to release the sub sea mechanically latched contactor 28 using the appropriate controller 36. Once the sub sea switch 28 state is changed, the electrical brake is released, and generation can commence.

Through use of an earth return circuit on the control coil of the contactor 28 only one control wire is needed per turbine generator 10. It will be noted that there are a limited number of control wires in a submarine power cable 38 and therefore a limited number of turbine generators 10 that can be fitted onto a single submarine power cable 38. By use of an earth return circuit for control, it effectively doubles the number of turbine generators 10 able to be controlled from a single power cable 38. Also, the voltage drop is halved, as the earth return circuit resistance is very small due to the large support structure 22 immersion in sea water. A continuous flow of control current may lead to corrosion over time or navigational interference. The use of a latched contactor 28 means control signals can be pulsed through the earth, and therefore has no impact on corrosion or the environment.

A second turbine can be added to the array at a later date using the same method as detailed above. The entire turbine string will need to be isolated, earthed and locked before a second turbine can be added. The entire string of turbines is then energised together.

The invention claimed is:

1. A method of installing a sub sea tidal hydroelectric turbine generator and connecting the hydroelectric turbine generator to a supply grid using a submarine power cable, wherein the hydroelectric turbine generator comprises an electrical braking system operable to apply an electrical brake to the hydroelectric turbine generator upon interruption of a control signal, wherein the control signal is transmitted from a controller at a connection point to said supply grid through said submarine power cable, the method comprising the steps of:
   (i) laying a submarine power cable into position, the submarine power cable extending from a first end, at a connection point to a supply grid, to a second end, at an installation site where it is desired to install the sub sea tidal hydroelectric turbine generator;
   (ii) connecting the submarine power cable to the connection point;

(iii) switching the submarine power cable out from the supply grid using a supply switch;
(iv) isolating the submarine power cable from the supply grid using an isolating switch, connecting the submarine power cable to earth;
(v) applying a safety padlock to the supply switch and the isolating switch;
(vi) interrupting a control signal at said controller by opening a control switch, applying an electrical brake to the turbine generator;
(vii) applying a safety padlock to the control switch;
(viii) deploying said hydroelectric turbine generator at said installation site;
(ix) connecting the submarine power cable to said hydroelectric turbine generator;
(x) removing the safety padlock from to the supply switch and the isolating switch;
(xi) disconnecting the power cable from earth using the isolating switch;
(xii) switching the power cable on to the supply grid using the supply switch;
(xiii) removing the safety padlock from the control switch; and
(xiv) closing the control switch, such that the electrical brake is removed from the hydroelectric turbine generator, and allowing the hydroelectric turbine generator to commence generation.

2. The method of claim 1, wherein the method further comprises the step of testing that all sub sea circuits are dead, prior to step (ix).

3. The method of claim 1, wherein steps (ii)-(viii) and (xi)-(xiv) are performed at said connection point.

4. The method as claimed in claim 1, wherein the method further comprises the steps of:
(a) recording a location designation associated with the second end of the submarine power cable once the submarine power cable has been switched out and isolated; and
(b) prior to step (ix), verifying that the hydroelectric turbine generator deployment is occurring at the location designation associated with the second end of said particular submarine power cable.

5. The method as claimed in claim 4, wherein said location designation comprises GPS co-ordinates.

6. The method as claimed in claim 1, wherein the method further comprises the steps of:
(a) closing a latched contactor on the hydroelectric turbine generator to connect the positive and negative output terminals of the hydroelectric turbine generator to earth prior to deploying said hydroelectric turbine generator at said installation site; and
(b) after the deployment of said hydroelectric turbine generator at said installation site, opening the latched contactor to disconnect the output terminals of the hydroelectric turbine generator from earth.

7. The method as claimed in claim 1, wherein step (ix) further comprises deploying said hydroelectric turbine generator at said installation site such that the axis of the turbine is aligned with the direction of the prevailing tidal current at said installation site.

8. The method as claimed in claim 1, wherein the hydroelectric turbine generator comprises a generator cable for connecting the hydroelectric turbine generator to a submarine power cable, and wherein step (x) further comprises recovering the second end of said submarine power cable and said generator cable to an installation vessel for connection, wherein the submarine power cable and the generator cable act to stabilise the installation vessel in position at said installation site.

9. A method of installing an array of hydroelectric turbine generators, comprising the steps of installing a single hydroelectric turbine generator as claimed in claim 1, wherein the hydroelectric turbine generator further comprises an expansion cable for connecting to a further hydroelectric turbine generator, such that a plurality of hydroelectric turbine generators can be daisy-chained together, and wherein the method further comprises the steps of:
(a) deploying a successive hydroelectric turbine generator at a successive installation site;
(b) connecting the expansion cable of the preceding hydroelectric turbine generator to the generator cable of the successive hydroelectric turbine generator; and
(c) repeating steps (a) and (b) for each of the hydroelectric turbine generators in the array, wherein steps (a)-(c) are performed prior to steps (xi)-(xiv).

* * * * *